United States Patent
Lehman

(10) Patent No.: US 7,209,153 B2
(45) Date of Patent: Apr. 24, 2007

(54) SYSTEM AND METHOD OF REPRESENTING PERSONAL PROFILE IN AUDITORY FORM

(76) Inventor: Barbara Lehman, 6711 E. Camelback Rd., #24, Scottsdale, AZ (US) 85251

(*) Notice: Subject to any disclaimer, the term of this patent is extended or adjusted under 35 U.S.C. 154(b) by 146 days.

(21) Appl. No.: 11/070,982

(22) Filed: Mar. 2, 2005

(65) Prior Publication Data

US 2005/0197874 A1    Sep. 8, 2005

Related U.S. Application Data

(63) Continuation-in-part of application No. 10/793,078, filed on Mar. 3, 2004.

(51) Int. Cl.
*G06T 5/00* (2006.01)
(52) U.S. Cl. .................. 345/956; 463/35; 704/272
(58) Field of Classification Search ............... 345/956; 463/35; 704/272
See application file for complete search history.

(56) References Cited

U.S. PATENT DOCUMENTS

| | | | |
|---|---|---|---|
| 4,616,327 A | 10/1986 | Rosewarne et al. | |
| 4,980,679 A | 12/1990 | Klaubert | |
| 5,681,046 A | 10/1997 | Lawrence | |
| 5,818,458 A | 10/1998 | Saito | |
| 5,877,774 A | 3/1999 | Saito | |
| 5,882,203 A | 3/1999 | Correa et al. | |
| 6,018,352 A | 1/2000 | Saito | |
| 6,061,681 A | 5/2000 | Collins | |
| 6,166,745 A | 12/2000 | Saito | |
| 6,685,479 B1 | 2/2004 | Ghaly | |
| 6,967,667 B2 | 11/2005 | Dworsky et al. | |
| 2002/0045154 A1 | 4/2002 | Wood et al. | |
| 2004/0148210 A1 | 7/2004 | Barrett et al. | |

OTHER PUBLICATIONS

Hearn, Donald and Baker, M. Pauline, "Computer Graphics", 1994, Prentice Hall, Inc., Second Edition, pp. 97 and 98.

*Primary Examiner*—Almis R. Jankus
(74) *Attorney, Agent, or Firm*—Robert D. Atkins; Quarles & Brady LLP

(57) ABSTRACT

An auditory representation of a personal profile of a subject is generated, by first, acquiring a plurality of personal attributes of the subject through an assessment tool. The plurality of personal attributes is stored on a first computer system. The plurality of personal attributes is converted to a plurality of musical elements. The plurality of musical elements is arranged to form an auditory representation of the personal profile of the subject.

16 Claims, 15 Drawing Sheets

SYSTEM AND METHOD OF REPRESENTING PERSONAL PROFILE IN AUDITORY FORM

CLAIM TO DOMESTIC PRIORITY

This application is a continuation-in-part of co-pending application Ser. No. 10/793,078 filed on Mar. 3, 2004. The present application claims priority to subject matter disclosed in the prior U.S. patent application Ser. No. 10/793,078.

FIELD OF THE INVENTION

The present invention relates in general to personal profiling using graphics and, more particularly, to system and method of representing personal and behavioral attributes in symmetrical graphical form.

BACKGROUND OF THE INVENTION

Personal profiling systems have long been used to characterize an individual's unique personality, character traits, preferences, and behaviors. In creating a personal or behavioral profile, people have filled out questionnaires and taken surveys that ask a variety of questions. The questions are often set up in multiple-choice format, or in the form of a Likert scale, e.g., scale of 1 to 5 where 1 is low or weak and 5 is high or strong. The surveys may be compiled as aggregated data and assessed in order to attribute a certain general character trait to the person. For example, the result of the survey may be an indication or statement that the person is conservative or liberal, or that the person is a hard-driving type-A or easy-going type-B. However, the information content is limited and often times too vague or general to be useful. Having only a simple statement that a person is type-A or type-B does not convey much specific or useful information about his or her overall behavioral profile.

There are numerous situations and applications where knowledge of relevant behavior profiles is relevant to a successful outcome. In sales and marketing applications, the more the salesperson knows about the personal profile of the customer, the better job he or she can do in meeting the customer's needs and closing the sale. In dating services; the more one client can learn about the persona of another client, the more likely the pairing will be enjoyable and successful for all concerned. In career counseling settings, the person's behavioral profile is directly relevant to finding the right job match.

A need exists to establish and communicate personal profiles in a meaningful and efficient manner to communicate information and understand behavior characteristics.

SUMMARY OF THE INVENTION

In one embodiment, the present invention is a method of generating a symmetrical graphical image representative of a personal profile of a subject comprising the steps of acquiring a plurality of personal attributes of the subject through an assessment tool, storing the plurality of personal attributes on a first computer system, converting the plurality of personal attributes to a plurality of graphical elements, and arranging the plurality of graphical elements to form a symmetrical graphical image as a visual representation of the personal profile of the subject.

In another embodiment, the present invention is a method of producing a visual representation of a personal profile comprising the steps of acquiring personal attributes through an assessment tool, converting the personal attributes to graphical elements, and arranging the graphical elements to form a symmetrical graphical image representative of the personal profile.

In another embodiment, the present invention is a method of generating a sensory representation of a personal profile of a subject comprising the steps of acquiring a plurality of personal attributes of the subject through an assessment tool, storing the plurality of personal attributes on a first computer system, converting the plurality of personal attributes to a plurality of sensory elements, and arranging the plurality of sensory elements to form a sensory representation of the personal profile of the subject.

In another embodiment, the present invention is a method of generating an auditory representation of a personal profile of a subject comprising the steps of acquiring a plurality of personal attributes of the subject through an assessment tool, storing the plurality of personal attributes on a first computer system, converting the plurality of personal attributes to a plurality of musical elements, and arranging the plurality of musical elements to form an auditory representation of the personal profile of the subject.

In another embodiment, the present invention is a method of producing an auditory representation of a personal profile comprising the steps of acquiring personal attributes through an assessment tool, converting the personal attributes to musical elements, and arranging the graphical elements to form an auditory representation of the personal profile.

DETAILED DESCRIPTION OF THE DRAWINGS

Each person has his/her own unique personality, character traits, preferences and behavior, collectively referred to as "personal" or "behavioral" profile. If the personal profile is compiled, analyzed, and converted to a graphical form or representation, then a significant amount of information can be conveyed in a relatively short time. People intake and process visual information, e.g., graphical images, much more efficiently and rapidly than written text or audible signals. The visual representation of a personal profile provides both high-density information content and relatively easy interpretation and absorption by the recipient.

Figure 1:
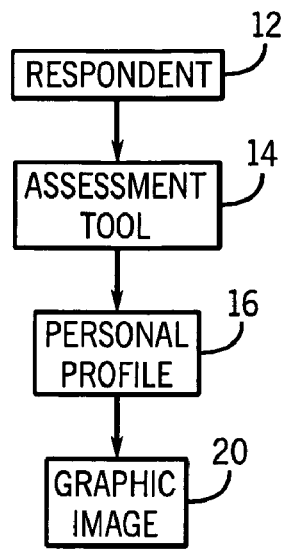
FIG. 1 illustrates a personal assessment process and generation of a representative graphical image.

The basic process flow of the present methodology of generating a graphical image from assessment data is shown in FIG. 1. Respondent 12 utilizes assessment tool 14 to create personal or behavioral profile 16. Personal profile 16 is the accumulation and output of assessment tool 14, and may take the form of a set of answers to specific questions. Personal profile 16 is stored in a computer system. The computer system generates a graphical image or form 20 based on personal profile 16. Graphical image 20 is representative of personal profile 16 associated with respondent 12.

Each person has a unique personal or behavioral profile. The profile arises from genetic predispositions, upbringing, mentors, environment, life experiences, goals, aspirations, morality, and spiritual beliefs. Each of these factors, and a host of other influences, form and shape our lives. While it is true that people grow, change, mature, and emotionally evolve, at any point in time, most people are relatively stable with a core set of beliefs and values.

The process of representing personal and behavioral profiles in graphical form involves collecting, transforming, and combining visual elements into a unique graphic image. The process begins with collecting personal information from the subject, e.g., respondent 12, using any one of a variety of profiling assessment tools 16. Assessment tool 16 collects an assortment of personal information about respondent 12. In one embodiment, assessment tool 16 is a written questionnaire or survey containing a series of questions. In another embodiment, the assessment process involves an in-person interview with a trained specialist. Alternatively, the assessment can be conducted through a website where the respondent clicks on answer choices with a mouse pointing device or responds through voice recognition capability.

Each question or series of questions reveals a specific behavioral tendency or character trait of the person being profiled. The question will set up a fact pattern or situation open to interpretation and will be directed to personal values, preferences, or interests. The questions are intended to allow respondent 12 to express his or her views. The possible or available answers to the questions may be organized in a multiple-choice format. Each question may have 3–6 available answer choices worded in such a manner to allow respondent 12 to express any one of a spectrum of reactions or views. The selection of an answer choice will be an indicator of his or her inner belief, feeling, personality, behavior, and/or point of view.

As an example, question no. 1 may worded as simply as "Do you enjoy activities with an element of risk, such as skydiving? The answer choices are: (a) yes; (b) depends on the circumstances; and (c) no." Question no. 2 may include further facts and more specific answers such as "Your boss has invited you to go on a potentially risky outing, such as skydiving. Assume you had never done this activity before. The answer choices are: (a) yes, because I enjoy new things, even if there is an element of risk or danger; (b) yes, even though I would not go on my own accord, it's the boss and I don't want to loose face or jeopardize my standing; (c) yes, even though I would not go on my own accord, I don't like saying no to anyone; (d) no, and I would explain to the boss that I have no interest or choose to avoid unnecessary risks; (e) no, I really don't want to go, but I would make up a false excuse to avoid any confrontation; and (f) no, even if it sounds interesting, I would explain to the boss that I don't mix work and social activities."

Alternatively, the possible or available answers to the questions may be arranged in the form of a Likert scale. The Likert scale gives the person a range of reactions or views to a given set of facts or situations open to interpretation. As an example, question no. 3 may make the statement "I am very comfortable talking to strangers" with five answer choices "strongly agree", "agree", "neutral", "disagree", and "strongly disagree".

The questionnaire or survey may contain a large number of questions, or the respondent may be subject to multiple surveys with different formats, possibly at different times and venues. The questions can be true/false, yes/no, multiple choice, Likert scales, or fill in the blank. The questions are grouped in such a way as to create levels or layers of probing and inquiry into personality and behavioral traits, which build on prior questions. The hierarchy of questions may change in terms of length, specificity, premise, and fact pattern. A first level may look at a character or behavioral trait generally. A second level may investigate the relative predominance of that trait in the overall personality profile. A third level may make inquiry into circumstances when the trait changes direction. For example, the first question or set of questions may establish that the respondent is fiscally conservative or liberal. A second question or set of questions may confirm that the trait is dominant or non-dominant depending on whether the respondent changes position based on the cause and other circumstances.

In another case, as a follow-up question no. 3, a subsequent question may state the proposition "I am very comfortable talking to new business acquaintances" with a similar Likert scale containing answer choices "strongly agree", "agree", "neutral", "disagree", and "strongly disagree." The respondent may disagree on question no. 3, but agree on the above follow-up question. The layers of questioning will probe and test the respondent's views and resolve in a particular position by changing the fact pattern. Even if respondent 12 originally expressed an interest in going skydiving, the survey may probe under what circumstances would the answer be negative. If respondent 12 originally answered no, the survey probes what facts might change the answer.

Moreover, the questions are grouped in such a way as to identify separate and distinct characteristics, behaviors, qualities, and attributes. One or more questions may indicate that the person is adversarial. Another question or group of questions may gage the respondent's personality or predisposition as directed toward accepting accountability. Yet another question or group of questions may disclose the respondent's interest or aspirations related to career goals. Another question or group of questions may reveal the respondent's feelings or values toward charity or generosity. And yet another question or group of questions may reveal the respondent's preferences related to marketing decisions or consumer purchases.

In a typical survey, a host of personality areas will be probed to discover the personal profile of respondent 12. For example, the questions may delve into personal and behavioral areas such as cognition, creativity, socialization, politics, character traits, predispositions, prejudices, spirituality, sexuality, values, hobbies, interests, preferences, aspirations, career goals, family history, and personal facts. In general the questions can be worded and grouped to reveal almost any personality trait, behavior, core value, specific tendency, or personal belief.

The questions are also repetitive to test the accuracy and consistency of prior answers. If respondent 12 originally answered that he or she strongly disagreed with question no. 3 (I am very comfortable talking to strangers), and then later strongly agrees that the person enjoys meeting new people at business mixers and social parties, then either the answers are inconsistent or the person has a narrow view of what constitutes a stranger. The assessment tool outcome can be disqualified if answers become too suspect, inconsistent, or uncertain.

Figure 2:
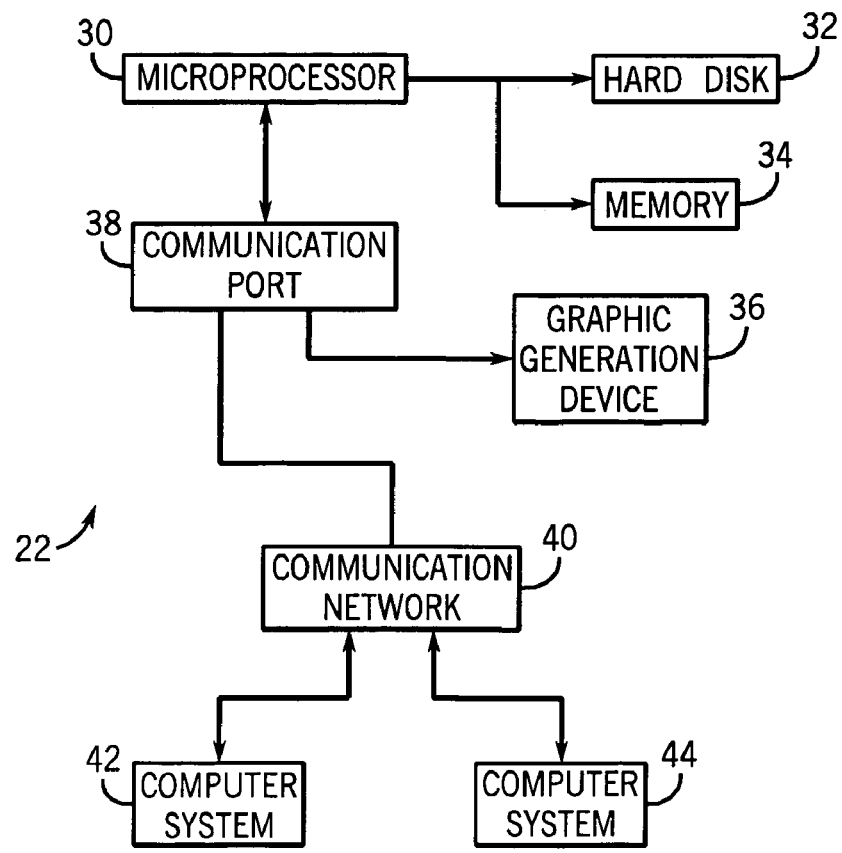
FIG. 2 is a block diagram of a computer system for processing and generating the graphical image from the assessment data.

The answers to the questionnaire or survey for each respondent are stored in database or other file structure for ease of organization, processing, analysis, reporting, and graphical generation. The database resides on computer system 22 as shown in FIG. 2. Computer system 22 is a general purpose computer including a central processing unit or microprocessor 30, mass storage device or hard disk 32, electronic memory 34, and communication port 38.

Communication port 38 includes a high speed Ethernet connection to communication network 40. Communication network 40 is an open architecture system such as the World Wide Web, commonly known as the Internet. Computer system 42 is configured as shown for computer 22 and is also connected to communication network 40, which allows communication between computers 22 and 42. Respondent 12 uses computer system 42 to log onto a profiling website residing on computer system 22. The questionnaire is displayed on computer system 42 for respondent 12 to answer the questions. The respondent's answers are transmitted to computer system 22. Computer system 22 contain software and program code necessary to execute the processes described herein. Another respondent uses computer system 44 for the same purpose.

Computer system 22 stores the answer data on hard disk 32 and utilizes one or more computer programs and other application software running on the general purpose computer system, with associated microprocessor, memory, hard disk storage, and communication links such as shown in FIG. 2, to organize, analyze, and process the assessment data. The assessment data is converted to graphical image, as described hereinafter, and output to graphics generation device 36. Graphic generation device 36 can be a printer, plotter, or commercial embossing or reproduction equipment. The graphical image can be printed or stored electronically as a computer file. The graphical image can be reproduced on virtually any surface or articles such as clothing, photographs, monograms, greeting cards, posters, mugs, business cards, logos, letterhead, and the like. The graphical image in electronic form can be inserted into documents, e-mails, websites, etc.

The manner in which the questions have been answered as well as the content of the answers are organized and processed into a selection of personal qualities that can be converted into a set of pre-defined graphic elements. The graphical elements provide an indication or representation of the respondent's tendency toward a particular attribute. For example, if the respondent is more or less aggressive, based on the scale of assessments, a set of graphic variables are generated with gradations of values of that particular attribute. If the respondent is more or less submissive, based on the scale of assessments, another set of graphic variables is generated with gradations of values of that particular attribute. Using techniques derived from other technologies such handwriting analysis and universal symbology, the graphic variables that attach to a particular characteristic are assigned to those characteristics and modified depending on the degree of evidence of such characteristics.

The graphic elements include formatting features such as shape (square, circle, triangle, line, waveform), orientation (high, low, right, left), relative dimensions, size (small, large), proportions, line weight (thin, thick), line width, line continuity, angle, facets, color, and shading. The formatting features are used to indicate relative importance of the personal attributes to the personal profile of the subject. The graphic elements are combined together to create an overall graphical image or form that is symmetrical, stylistic and pleasing to the eye, yet conveys considerable information to the observer or recipient related to the respondent's personal and behavioral profile. The graphic elements have meaning, both individually and collectively. The final graphical image appears as a kaleidoscopic of images composed of individual graphic elements. In some views, the graphical image is akin to a snowflake-like design or image.

Consider the following example profiling session where assessment tool 14, e.g., questionnaire, provides a large number of questions with Likert-scale answers. The questionnaire may contain 50 to 200 or more questions. The example profiling session is simplified in number and complexity of questions for the purpose of understanding and illustration. The questions ask whether the person considers himself or herself to be:

TABLE 1

Personality Profile Questions

| | strongly agree | agree | neutral | disagree | strongly disagree |
| --- | --- | --- | --- | --- | --- |
| Sensitive | ○ | ○ | ○ | ○ | ○ |
| Competitive | ○ | ○ | ○ | ○ | ○ |
| Reliable | ○ | ○ | ○ | ○ | ○ |
| Intuitive | ○ | ○ | ○ | ○ | ○ |
| Dominant | ○ | ○ | ○ | ○ | ○ |
| Meticulous | ○ | ○ | ○ | ○ | ○ |
| Independent | ○ | ○ | ○ | ○ | ○ |
| Focused | ○ | ○ | ○ | ○ | ○ |
| Reserved | ○ | ○ | ○ | ○ | ○ |
| Shy | ○ | ○ | ○ | ○ | ○ |
| Efficient | ○ | ○ | ○ | ○ | ○ |
| Imaginative | ○ | ○ | ○ | ○ | ○ |
| Persistent | ○ | ○ | ○ | ○ | ○ |
| Motivated | ○ | ○ | ○ | ○ | ○ |
| Happy | ○ | ○ | ○ | ○ | ○ |
| Generous | ○ | ○ | ○ | ○ | ○ |
| Persuasive | ○ | ○ | ○ | ○ | ○ |
| Decisive | ○ | ○ | ○ | ○ | ○ |
| Worried | ○ | ○ | ○ | ○ | ○ |
| Flexible | ○ | ○ | ○ | ○ | ○ |
| Outgoing | ○ | ○ | ○ | ○ | ○ |
| Intense | ○ | ○ | ○ | ○ | ○ |
| Adventuresome | ○ | ○ | ○ | ○ | ○ |
| Warm | ○ | ○ | ○ | ○ | ○ |

Assuming that the questions and answers are provided on the profiling website, then respondent 12 clicks each selection with mouse pointing device. In another embodiment, the answers choices are provided on a continuous sliding scale. Respondent 12 uses the mouse to drag a pointer along the sliding scale to the appropriate answer and release the mouse to record the answer in a real number format. The answers are transmitted electronically over communication network 40 to computer system 22.

The answers are stored electronically in the database on hard disk 32. The answers are then organized or linked in such a manner as to facilitate further processing. The answers may be converted to numeric codes or equivalents. The answer "strongly agree" may be "1"; the answer "agree" may be "2"; the answer "neutral" may be "3"; the answer "disagree" may be "4"; the answer "strongly disagree" may be "5". The questions related to a particular personality or behavioral attribute are grouped or linked together. Moreover, the questions which are related to varying degrees of the given personality or behavioral attribute are organized or linked together. On the sliding scale, the answer to one question may be "3.5" or, when considered as a group, and averaged or otherwise combined together, the group attribute may assume a real number value. For example, the group of question may be directed to the behavior trait of Accountability To Others. From the respondent's answers to the related questions, the average or composite real value for the specific trait may be 7.3.

When the organizational pre-processing is complete, respondent's answers are arranged in a table of specific personality or behavioral attributes with associated real number values, such as shown in Table 2. The number values represent an attribute index or numeric code associated with the personal characteristic.

TABLE 2

Personal Attributes and Real Values

| Personal Trait | Value |
|---|---|
| Accountability To Others | 7.3 |
| Accurate Listening | 7.9 |
| Attention To Detail | 8.0 |
| Attitude Toward Honesty | 7.8 |
| Attitude Toward Others | 8.6 |
| Balanced Decision Making | 7.7 |
| Commitment To The Job | 6.7 |
| Conceptual Thinking | 7.9 |
| Concrete Organization | 8.1 |
| Consistency And Reliability | 7.5 |
| Conveying Role Value | 7.6 |
| Correcting Others | 8.6 |
| Creativity | 8.5 |
| Developing Others | 9.0 |
| Emotional Control | 7.2 |
| Empathetic Outlook | 8.6 |
| Enjoyment Of The Job | 7.6 |
| Evaluating Others | 8.3 |
| Evaluating What Is Said | 7.9 |
| Following Directions | 6.7 |
| Freedom From Prejudices | 9.0 |
| Gaining Commitment | 6.7 |
| Goal Directedness | 6.3 |
| Handling Rejection | 6.4 |
| Handing Stress | 8.3 |
| Human Awareness | 8.6 |
| Initiative | 7.1 |
| Integrative Ability | 7.5 |
| Internal Self Control | 6.3 |
| Intuitive Decision Making | 8.5 |
| Job Ethic | 6.5 |
| Leading Others | 8.3 |
| Long Range Planning | 7.4 |
| Material Possessions | 6.9 |
| Meeting Standards | 6.7 |
| Monitoring Others | 8.6 |
| People Reading | 8.6 |
| Persistence | 6.5 |
| Personal Accountability | 8.1 |
| Personal Commitment | 6.7 |
| Personal Drive | 7.1 |

TABLE 2-continued

Personal Attributes and Real Values

| Personal Trait | Value |
|---|---|
| Personal Relationships | 8.6 |
| Persuading Others | 8.0 |
| Practical Thinking | 8.1 |
| Proactive Thinking | 7.9 |
| Problem And Situation Analysis | 7.4 |
| Problem Management | 7.8 |
| Problem Solving | 8.0 |
| Project And Goal Focus | 6.3 |
| Project Scheduling | 6.9 |
| Quality Orientation | 8.0 |
| Realistic Expectations | 8.3 |
| Realistic Goal Setting For Others | 8.7 |
| Realistic Personal Goal Setting | 7.8 |
| Relating To Others | 8.6 |
| Respect For Policies | 7.9 |
| Respect For Property | 8.1 |
| Results Orientation | 7.9 |
| Role Awareness | 6.9 |
| Role Confidence | 7.6 |
| Seeing Potential Problems | 7.3 |
| Self Assessment | 6.6 |
| Self Confidence | 7.5 |
| Self Direction | 6.4 |
| Self Discipline And Sense Of Duty | 6.4 |
| Self Esteem | 8.3 |
| Self Improvement | 8.3 |
| Self Management | 6.9 |
| Self Starting Ability | 6.9 |
| Sense Of Belonging | 7.9 |
| Sense Of Mission | 6.4 |
| Sense Of Timing | 7.6 |
| Sensitivity To Others | 8.3 |
| Status And Recognition | 8.1 |
| Surrendering Control | 8.5 |
| Systems Judgment | 7.9 |
| Taking Responsibility | 8.1 |
| Theoretical Problem Solving | 7.5 |
| Understanding Attitude | 8.6 |
| Understanding Motivational Needs | 9.0 |
| Understanding Prospect's Motivations | 9.0 |
| Using Common Sense | 8.2 |

Next, the table of behavioral and numeric content is converted to graphic elements or symbols associated with specific personal attributes. The personality attributes include such general character polarities as outgoing, reserved, dominant, submissive, feminine, masculine, logical, emotional, strong, weak, adventuresome, cautious, conservative, liberal, extravagant, thrifty, homebody, socialite, etc. Other personality attributes include more specific preferences for different music, literature, film, art, politician, entertainer, sport, hobby, pastime, clothing, food, beverage, automobile, vacation, pet, decor, color, flower, and the like.

The conversion process takes each personality attribute or set of related attributes and creates a corresponding graphical element. The graphical elements utilized for the personality attributes can be any geometric shape, symbol, or form. In one embodiment, the graphical element for feminine traits is a circle; the graphical element for masculine traits is a rectangle; the graphical element for sense of belonging is a parallelogram; the graphical element for accountability is a line; and so on.

Each graphical element can be weighted to emphasize degrees or variations in the given personality trait. The graphical elements can be made different sizes to emphasis dominance, importance, and significance. The lines defining the graphical element can be broken, shaded, made heavy or light, angled, directional, and assigned one or more colors and hues, all corresponding to the respondent's answers. For example, a high cross on a "T" may indicate strong ego, whereas a low cross "T" shows low self-esteem. The cross on the "T" may be angled up for optimism or down for depression. A tall "T" shows arrogance. A heavy or deep "T" may be representative of competitiveness and confidence.

Consider the creation of the following graphical element or facet. While creative in content, the facet is created with a pre-defined set of graphical conversion rules. There may exist multiple sets of rules in converting personal traits and values to graphical elements. Moreover, the graphical conversion rules can be changed from time to time. Nonetheless, for a given group of personal traits and values, and a given set of conversion rules, the facet takes on a predictable form and shape. The graphical conversion rules evaluate and translate numerical valuation of personal and behavioral traits into position, length, curve, thickness, and color of graphical symbols on the x-axis and y-axis. However, for a different group of personal traits and values, and given the same set of conversion rules, the resulting facet will be different. Therefore, each unique set of personal traits and values, for a given set of rules, will create a unique facet.

Figure 3A:
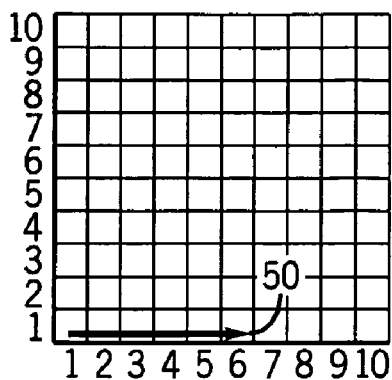
FIGS. 3A–3O illustrate a process of creating a graphical facet.
Figure 3B:
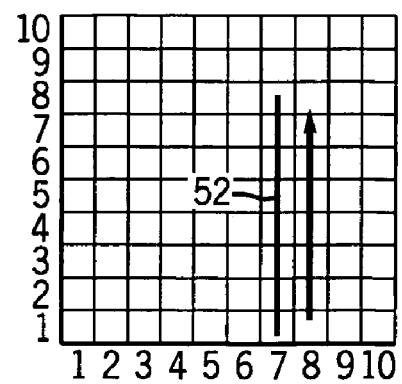
Figure 3C:
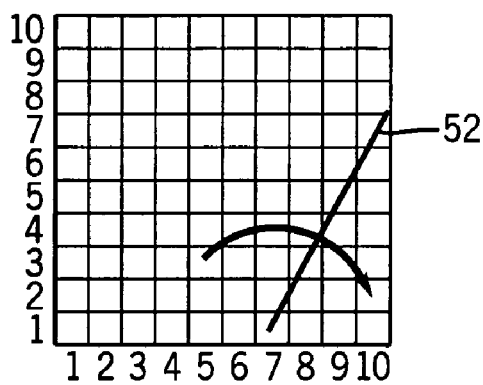
Figure 3D:
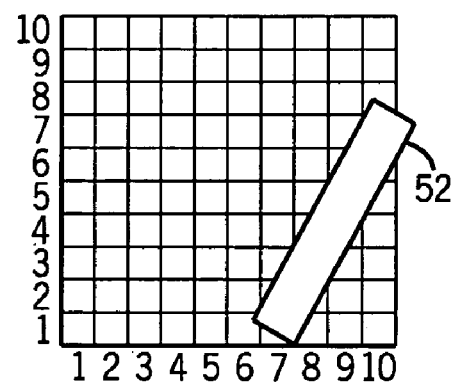
Figure 3E:
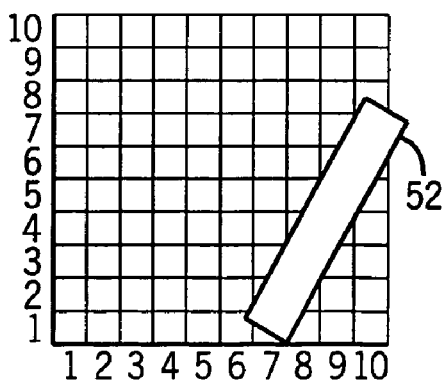

In FIG. 3A, the value of the personal trait Confidence is 6.0. From the origin, a reference point 50 is made 6.0 units to the right. In FIG. 3B, the personal trait Sense of Belonging has a value 7.5. A line 52 is drawn from reference point 50 up 7.5 units. In FIG. 3C, the personal trait Optimism has a value 6.8, which is converted to 15 degrees. Each unit is assigned to be 10 degrees. Line 52 is angled 15 degrees to the right. If the personal trait Optimism had a value of 3.2, then line 52 would be angled 15 degrees to the left. In FIG. 3D, the personal trait Aggressiveness has a value 5. The line thickness is increased by 5 points. In FIG. 3E, the aggregate value of personal traits High-Self Image and Aggressiveness combine to a value of 1.5. Line 52 is given the color of blue.

Figure 3F:
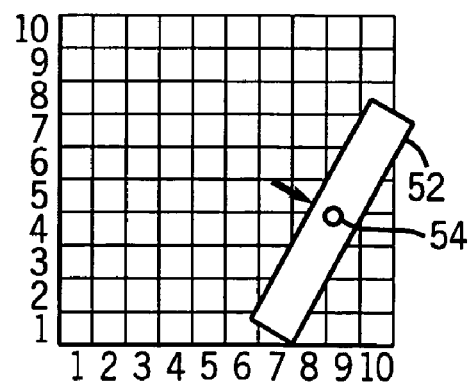
Figure 3G:
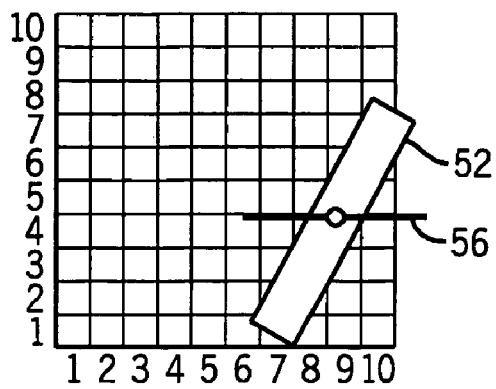
Figure 3H:
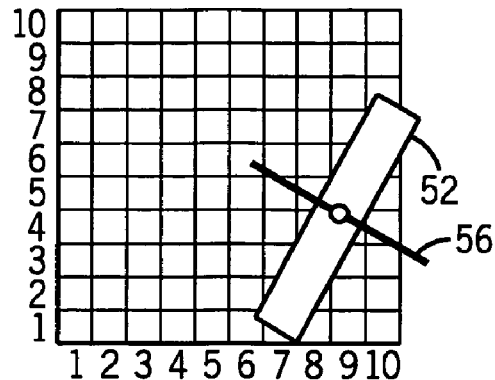
Figure 3I:
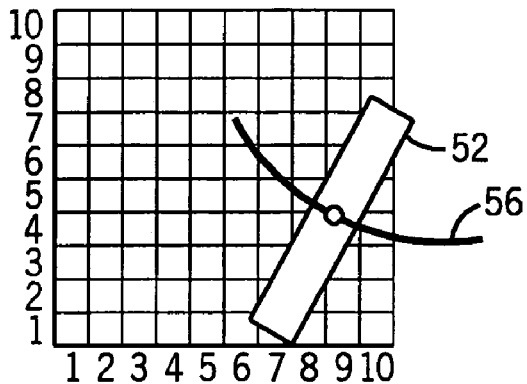
Figure 3J:
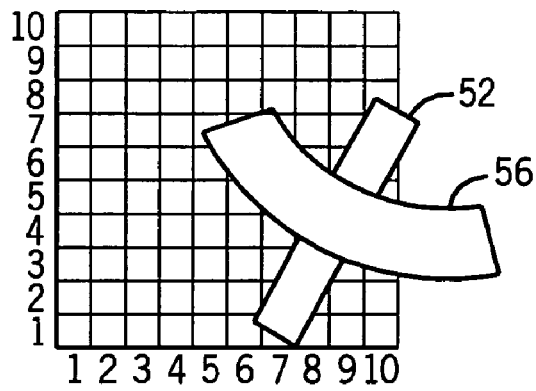
Figure 3K:
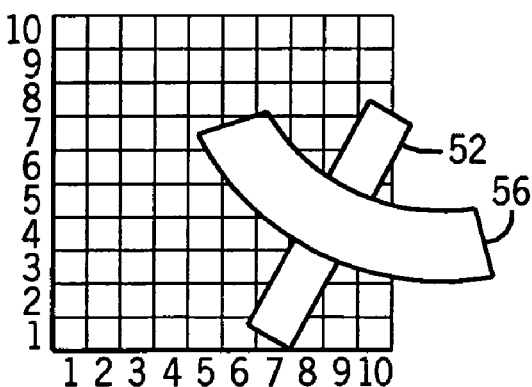

In FIG. 3F, the personal trait Self Esteem has a value 4.5. A second reference point 54 is established at a location on line 52, which is 4.5 units up the y-axis. In FIG. 3G, the personal trait Enthusiasm has a value 8. A horizontal line 56 is drawn with length of 8 units centered on the second reference point 54. In FIG. 3H, the personal trait Dominance has a value 7, which is converted to 20 degrees. The second line 56 is angled 20 degrees down to the right with respect to the x-axis. If the personal trait Dominance had a value of 3, then the second line 56 would be angled 20 degrees down to the left with respect to the x-axis. In FIG. 3I, the personal trait Control/Humor has a value 5.3. The second line 56 is concaved up with corresponding magnitude. In FIG. 3J, the personal trait Ego has a value 9.5. The line thickness is increased by 9.5 points. In FIG. 3K, the aggregate value of personal traits Creativity and Goal Directedness combine to a value of 9. Line 56 is given the color of red.

Figure 3L:
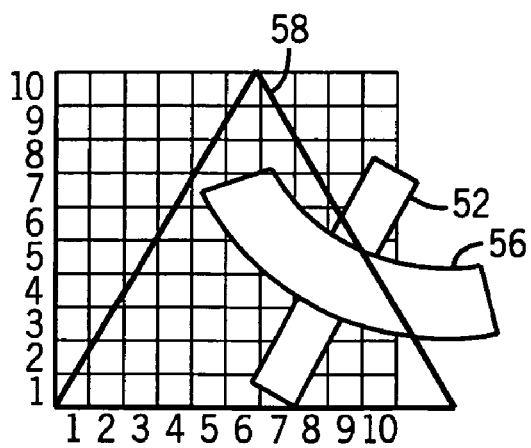
Figure 3M:
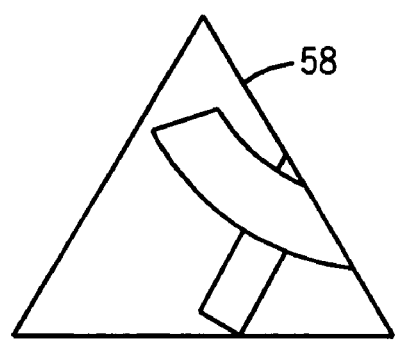
Figure 3N:
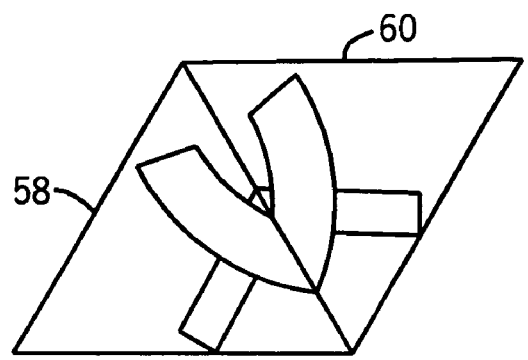
Figure 3O:
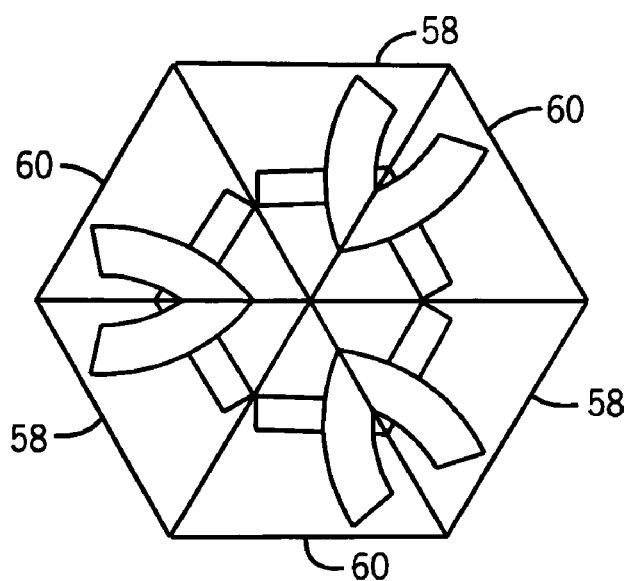

In FIG. 3L, triangle 58 is superimposed over blue line 52 and red line 56. In FIG. 3M, the portions of the blue line 52 and red line 56 within triangle 58 are isolated as an individual object. In FIG. 3N, triangle 58 is mirrored to create triangle 60 with corresponding duplicated segments of the blue line 52 and red line 56 as shown. In FIG. 3O, the mirror image, including the duplicated segments of the blue line 52 and red line 56, are replicated to form a hexagon.

The graphical image in FIG. 3O is a simplified facet. The final graphical form will contain multiple facets. Each of the multiple facets originates from the personal attributes and associated numeric value data. Some facets are formed by processing a first set of the personal attribute data through a first set of graphical conversion rules, such as described above for FIGS. 3A–3O. The graphical conversion rules define how each item of personal attribute data gets converted to a graphical element or representation. The personal attribute numeric data directs and guides a little more or a little less to the implementation of the graphical symbols. Collectively the personal attribute data creates the facet shown in FIG. 3O. Other facets are formed by processing a second set of the personal attribute data through a second set of graphical conversion rules, in a similar manner as described above for FIGS. 3A–3O, but achieving a different form and shape of facet. Yet other facets can be formed by processing other sets of the personal attribute data through other sets of graphical conversion rules. It is also possible to create facets by processing the first set of the personal attribute data through the second set of rules, or by processing the second set of the personal attribute data through the first set of rules. In other words, the overall conversion rule sets and processing guidelines can become multi-leveled and interchangeable. Any given set of personal attribute data can be processed through any set of graphical conversion rules to create a variety of facets.

Figure 4A:
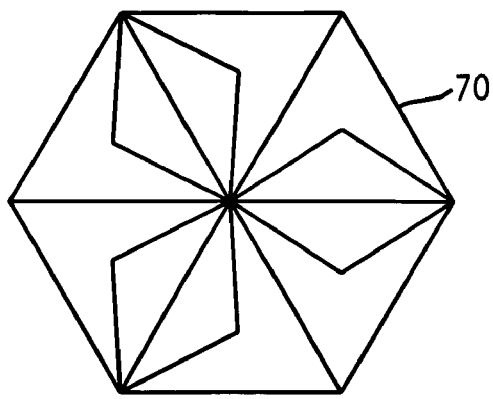
FIGS. 4A–4D illustrate a variety of graphical facets.
Figure 4B:
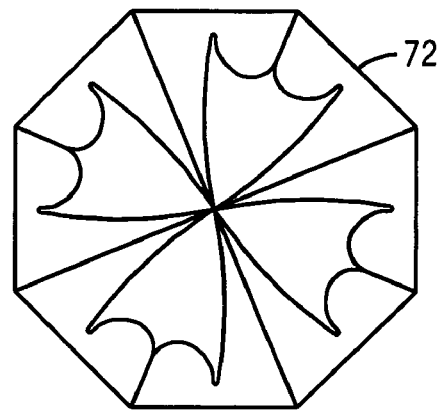
Figure 4C:
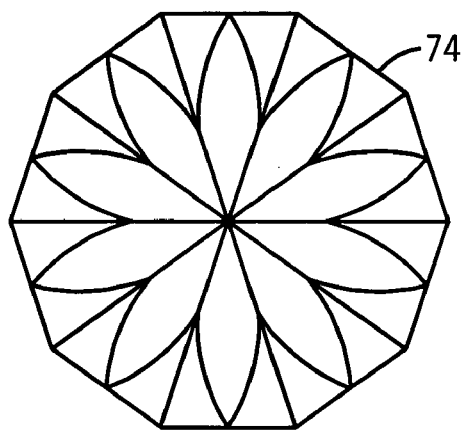
Figure 4D:
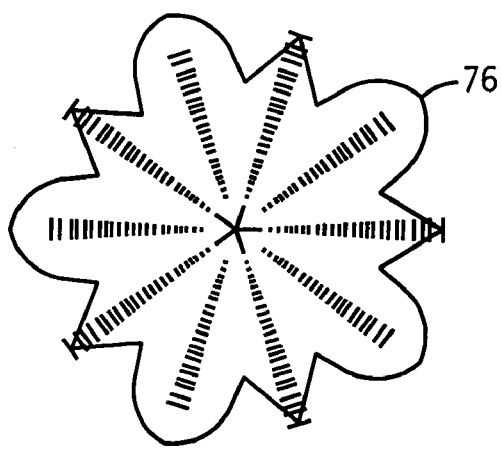

FIGS. 4A–4D illustrates a variety of facets created from personal attribute data. FIG. 4A is a six-sided facet 70; FIG. 4B is an eight-sided facet 72; and FIGS. 4C and 4D illustrate ten-sided facets 74 and 76, respectively. Each facet comprises different forms and shapes derived from the personal traits as processed through the various sets of graphical conversion rules.

Figure 5A:
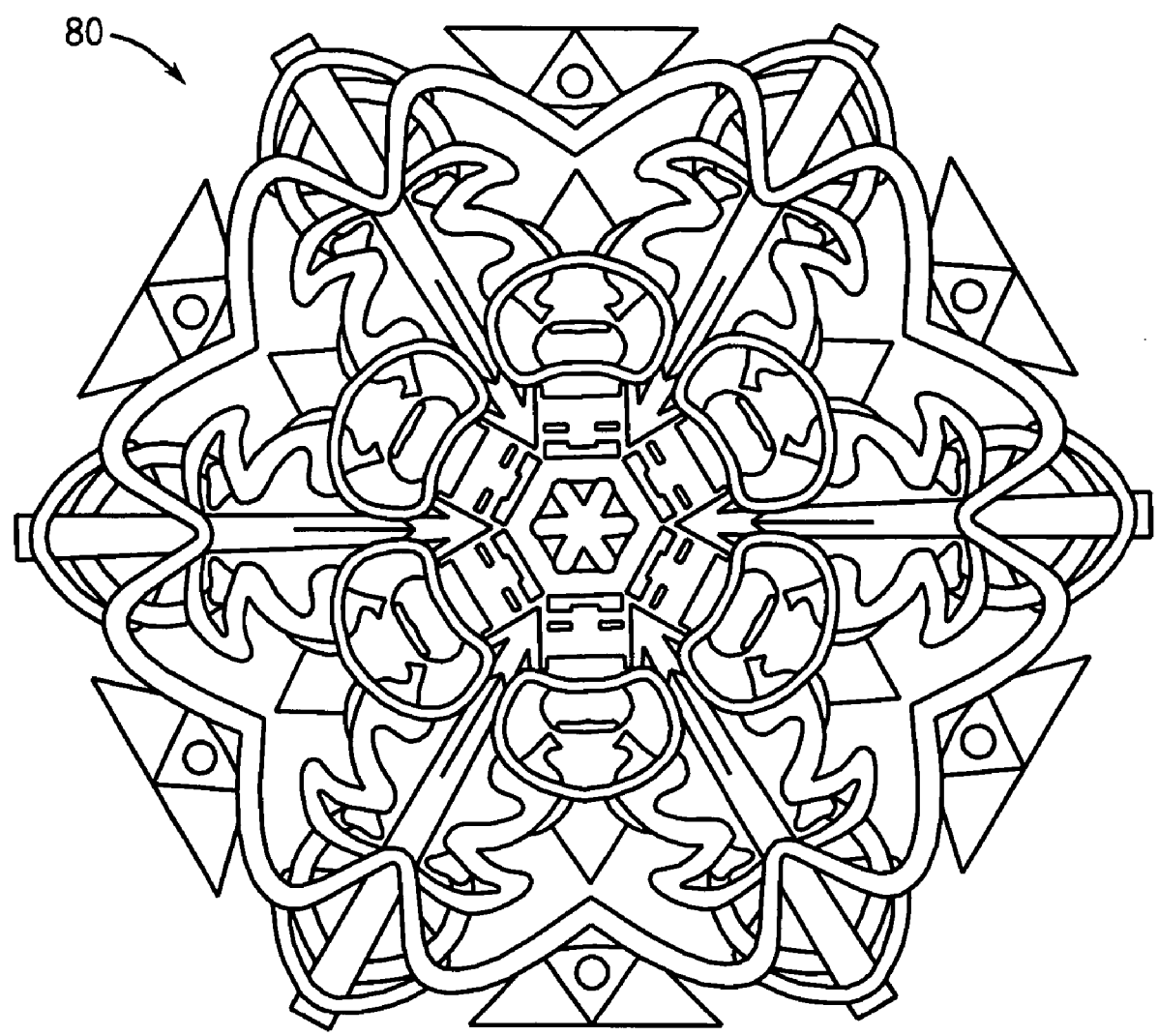
FIG. 5A illustrates a top view of a first graphical image representing the respondent personal profile.
Figure 5B:
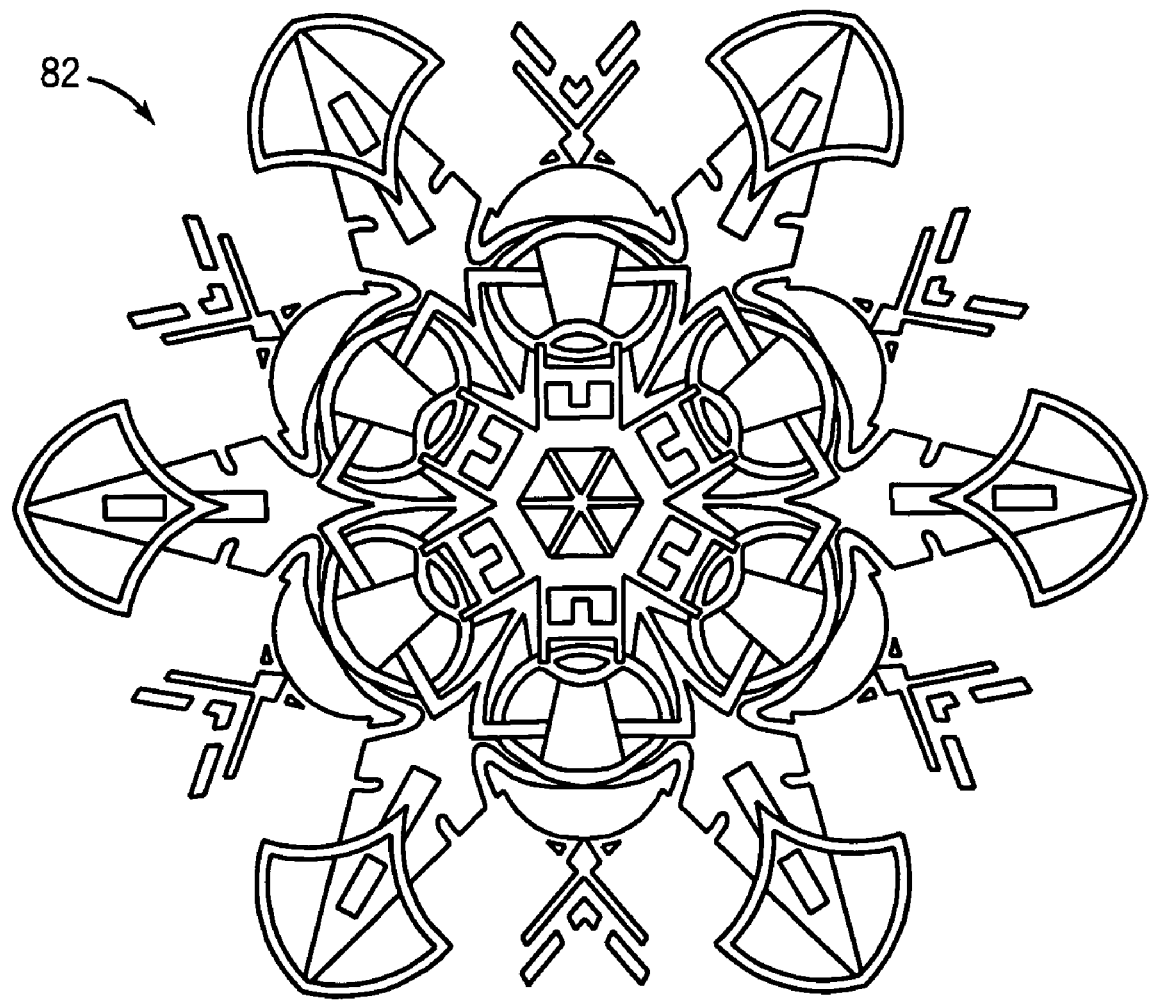
FIG. 5B illustrates a top view of a second graphical image representing another respondent personal profile.

The multiplicity of facets is combined together to form graphical image 80 such as shown from a top view in FIG. 5A. The graphical image 80 is laid out in a symmetrical manner with respect to the placement and use of the multiple facets. The symmetry is accomplished by aligning and placing multiple facets in a repetitive design. The repetitive design comprising multiple facets derived from the personal and behavioral traits provides the visual effect and information content of the graphical image. FIG. 5B illustrates another graphical image 82 which may be formed from responses to assessment tool 14 from a different respondent. Graphical image 80 is unique and different from graphical image 82. Both graphical images 80 and 82 are symmetrical representations of personal or behavior profiles.

The graphical image is created in layers and put together using symmetrically placed and oriented facets to create the look or resemblance of a kaleidoscope or snowflake-like design. The facets are located in respective and opposing positions and with consideration of relative importance of each of the plurality of personal attributes to the personal profile of the subject. Color is emphasized for dimensionality and depth perception. The symmetry of the design adds to its visual appeal, uniqueness, and interpretative properties. Certain areas or portions of the graphical image are associated with particular personal and behavioral attributes. One portion of the graphical image, based on the personal traits that went into forming the respective facets used in that portion, may be indicative of interests. Another portion of the graphical image, again based on the personal traits used to form the respective facets, may demonstrate values. Yet another portion of the graphical image shows the respondent's preferences.

Overall, the respondent's personal identity profile manifests into a symmetrical graphical image that is unique to that person's personal profile. The graphical image is a unique and individualized personal identity system. The graphical image can be read or decoded to understand those personal and behavioral traits, or simply appreciated for its aesthetic and ornamental properties.

Figure 6:
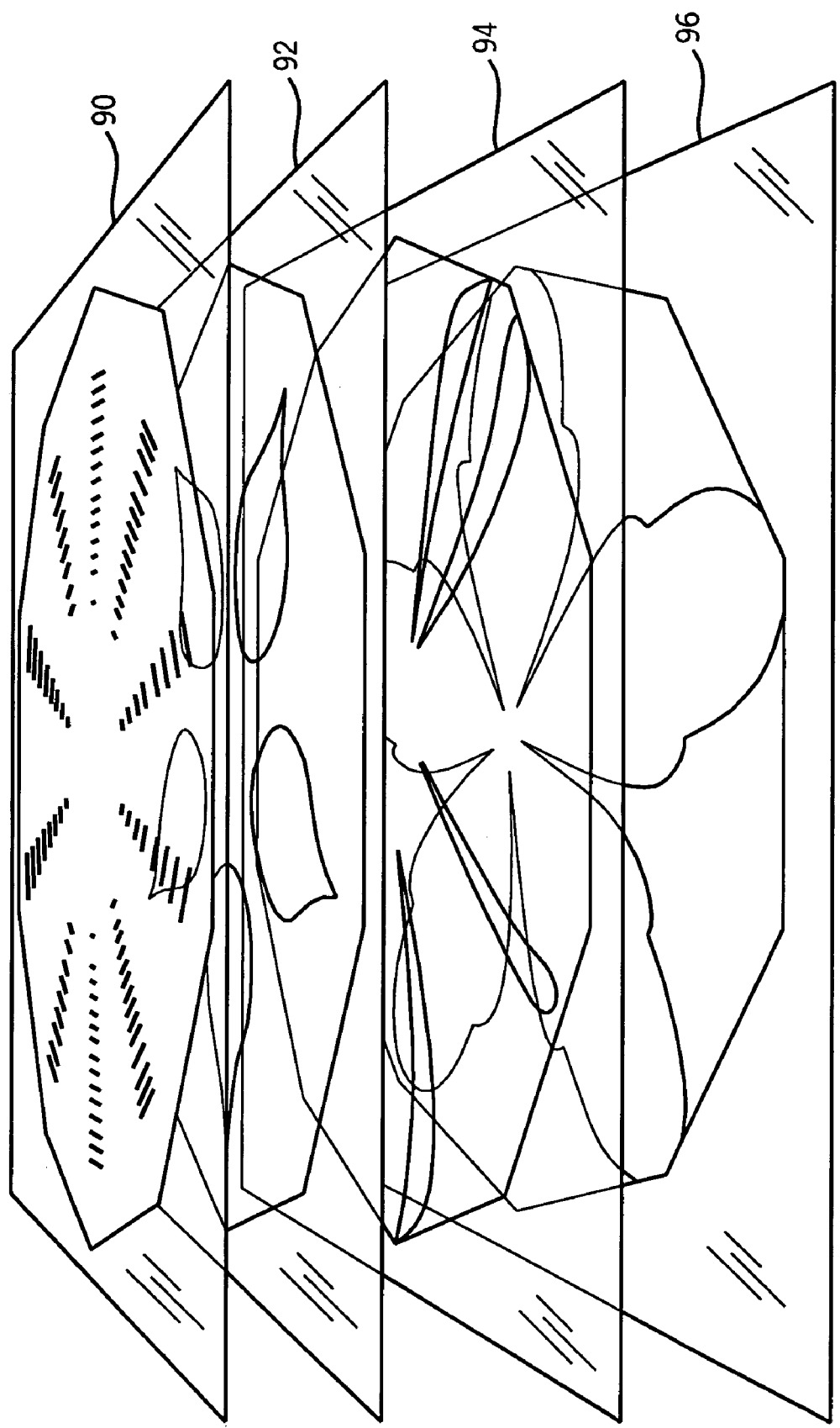
FIG. 6 illustrates a multi-layer graphical image representing the respondent personal profile.

The graphical image may be composed of multi-layer arrangement of the graphical elements or facets. The layers of construction have meaning as well. Turning to FIG. 6, layer 90 may go to encryption, layer 92 addresses cognition, layer 94 relates to socialization, and layer 96 is representation of character. The assignment of attributes to layer 90–96 involves both the construction of the multi-dimensional graphical image and its interpretation.

Figure 7A:
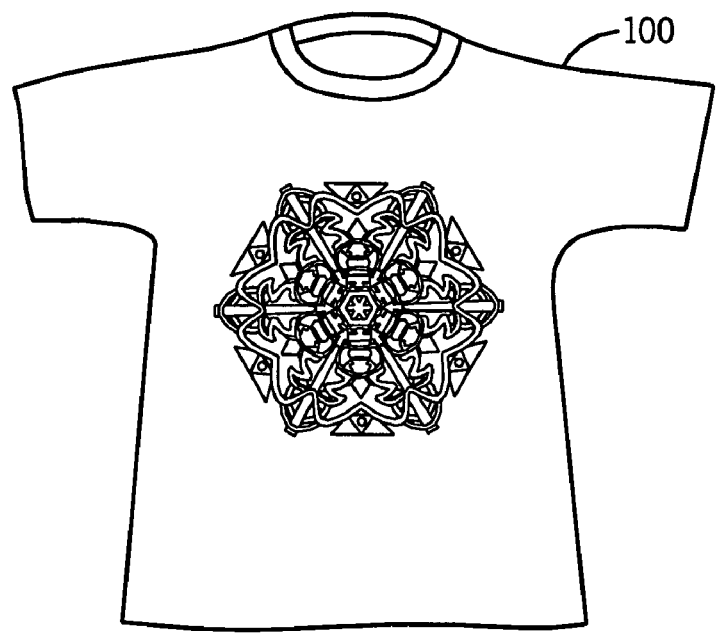
FIGS. 7A–7D illustrates various articles of manufacture embodying the symmetrical graphical image.
Figure 7B:
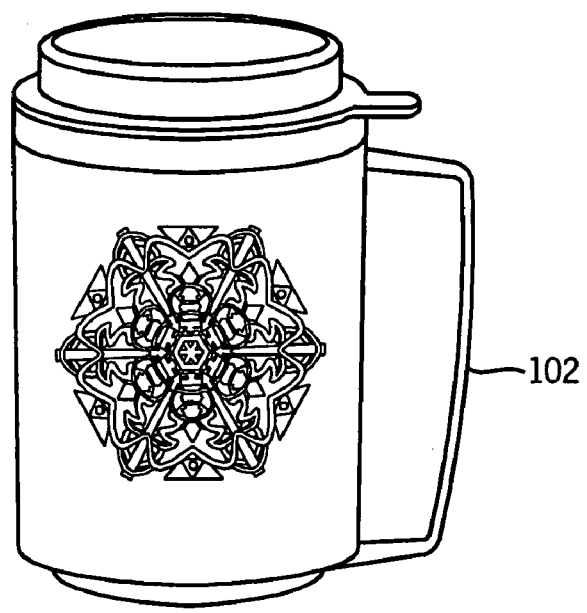
Figure 7C:
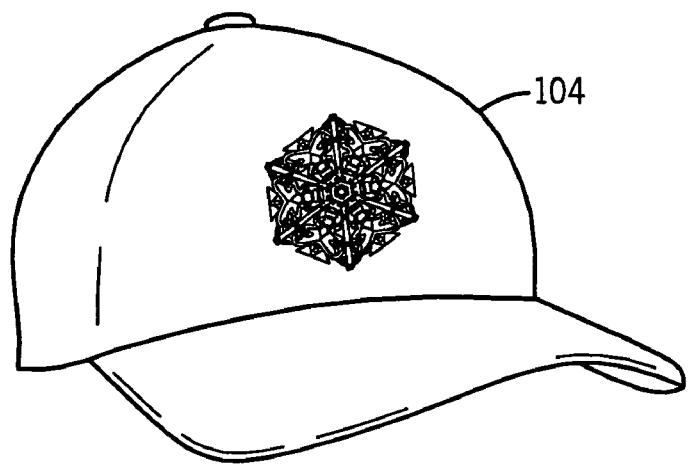
Figure 7D:
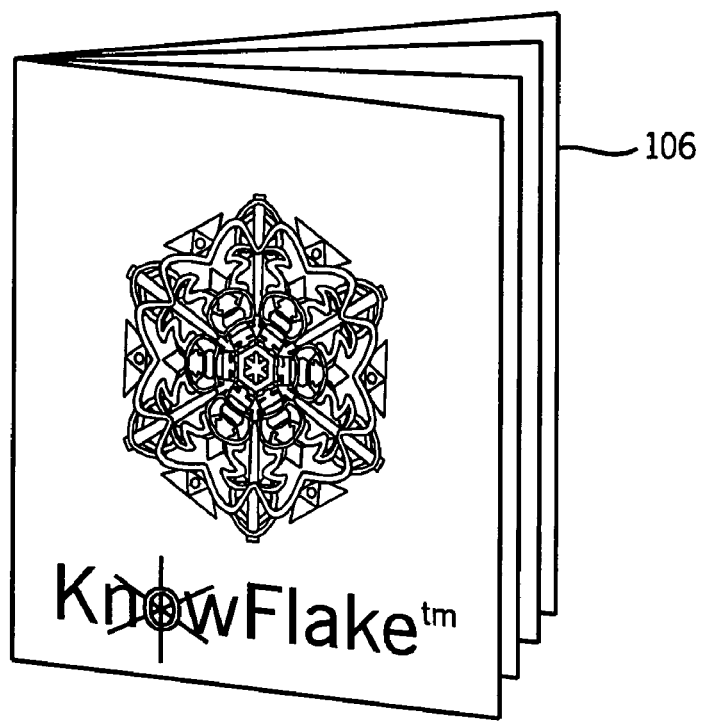

The resulting graphical image is unique, interesting, and visually attractive. The graphical image can be used in a myriad of applications. In one application, the graphical image is a novelty item for personal expression, e.g., for the teenage consumer. A link to the assessment tool and graphical image generator is placed as a banner ad with various teen websites, or the teen stops by a store or booth at the local mall offering the assessment survey. The respondent takes the assessment survey and receives a sample of the graphical image. The respondent further has access to a variety of reports that further express the survey results in graphical form or image, and can order a variety of articles of manufacture with the graphical image attached thereto, such as clothing, stationary, photographs, monograms, greeting cards, posters, mugs, business cards, and other personal items as an expression of their mark or brand, or as a manifest their self image, individuality, or uniqueness. FIG. 7A shows the graphical image on shirt 100; FIG. 7B shows the graphical image on mug 102; FIG. 7C shows the graphical image on cap 104; and FIG. 7D shows the graphical image on booklet or card 106. The young adult market may find it desirable to use the graphic image as a fashion statement or expression of creativity. The image can be a real conversation piece at parties and social events, and be integrated into novelties and games.

People without proper training or an understanding of the various graphical elements and their interrelationship may not be able to readily discern or accurately read the graphical image. However, a written description and brief analysis of the graphical image may accompany the mark to aid with the proper interpretation. Nonetheless, even without such information, people will be able to ascertain general degrees and interrelationship of shapes, boldness, density, and color to appreciate the graphical image.

The graphical image is derived from the respondent's answers to a detail assessment of their personality traits and attributes. The assessment is sufficiently detailed and the answers sufficiently varied that, in combination with the graphical conversion rules, it is virtually certain that no two people with have exactly the same graphical image. Therefore, each graphical image generated by computer system 22 is considered to be unique.

In another application, the uniqueness of image is valuable as a personal identifier. The graphical image can be digitally scanned and coded on a point-by-point or pixel-by-pixel basis. Once the known image is scanned and stored, a reader can scan an image presented for identification and compare the presented image to the known stored image. If the reader determines the images match, then identification is confirmed.

On-line secured transactions can benefit from a unique personal identifier that does not necessarily involve personal confidential information such as date of birth, social security number, address, and financial account numbers. The graphical image is void of such traceable descriptive fields. A graphical image owner can establish an account with a website service or vender. If the image owner wants to purchase an item from the vender, the image owner transmits the graphical image to the website or processes the image through a reader and the image is confirmed against the account records. The website has thus confirmed the identity of the party with whom they are dealing. The unique graphical image can provide access to secured areas such as gated communities and locked areas. A card reader will read the image, identify it as approved for access, and open the gate.

The graphical image can be used in applications involving other forms of data aggregation. The image can be merged or combined with various reports to personalize or add information content to the report. For example, in the career placement field, the graphical image can be combined with a professional skill set assessment or resume.

In yet another application, the graphical image can be read to gain an accurate assessment of personality profile of the image owner. In the dating service arena, the personality profile is important to finding a compatibility between prospective clients. While it has been said that opposites attract, it is also well accepted that some common ground is necessary to a meaningful relationship. In either case, the personality profile presented in graphical form is an efficient, high content density, and readily understood manner of assessing the likely success of a potential pairing. By reading and interpreting the graphical image, possibly with the assistance of a trained assessment advisor, the client will be able to determine whether or not the person behind the graphical image is internally attractive and compatible, and whether a connection can be made. The graphical image has less chance of self-deception, misrepresentation, and posturing. The variety and nature of questions will highlight inconsistent answers. The assessment can be administered by a trained specialist to compare answers to observable and recognizable character traits derived from separate interview sessions. The graphical image is reliable in providing an accurate and authentic representation of the personality profile of people.

In marketing and sales applications, being able to read the graphical image will help the salesperson to understand the customer's preferences in order to meet those needs and execute more sales. If the customer has tendency for a thrifty purchases, as expressed in the customer's image, then the salesperson should not waste time with high-end merchandise. If the customer's image shows a preference for rock music and expressive clothing, then the salesperson can direct the customer to the proper choices.

In still further applications, the graphical image can be used on various reports for human resource (HR) functions and to provide analysis of personal and behavior tendencies for career assessments.

Figure 8:
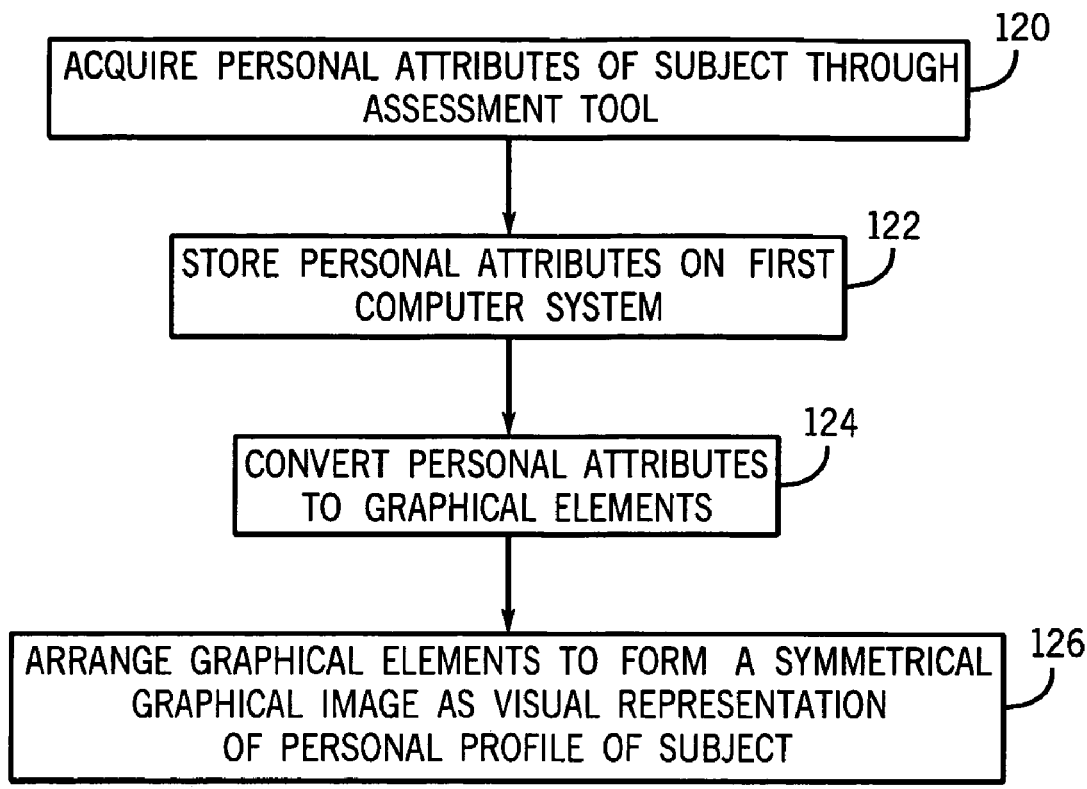
FIG. 8 illustrates the process of converting assessment data to a graphical image representing the respondent personal profile.

FIG. 8 illustrates the process of generating a symmetrical graphical image representative of a personal profile of a subject. Step 120 acquires personal attributes of the subject through an assessment tool. The assessment tool uses questions directed to personality traits of the subject. The personal attributes are acquired from answers to the questions directed to personality traits of the subject. Step 122 stores the personal attributes on a first computer system. The personal attributes are acquired by way of the subject accessing the assessment tool through a second computer system connected over a communication network to a website which resides on the first computer system. Step 124 converts the personal attributes to graphical elements. The graphical elements use formatting features such as shape, dimensions, size, orientation, color, line weight, line continuity, angle, and shading to indicate relative importance of the personal attributes to the personal profile of the subject. Step 126 arranges the graphical elements to form a symmetrical graphical image as a visual representation of the personal profile of the subject. The graphical elements within the symmetrical graphical image are located in relative positions and with consideration of relative importance of each of the plurality of personal attributes to the personal profile of the subject. The graphical image is symmetrical and multi-layered.

Figure 9:
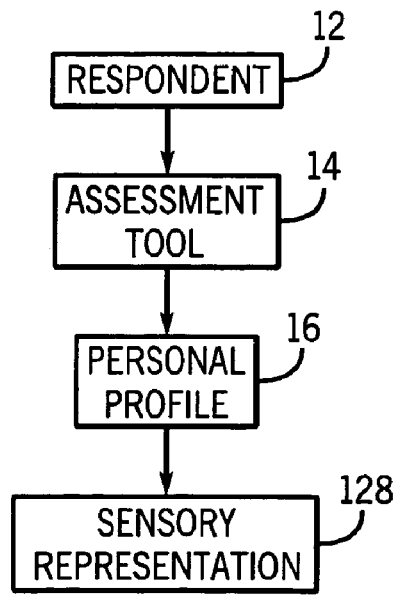
FIG. 9 illustrates a personal assessment process and generation of a sensory representation.

In addition to using the above-described method to generate a symmetrical graphical image, the method can be utilized to generate any sensory representation of a personal profile. The basic process flow of using the present methodology to generate any sensory representation is shown in FIG. 9. Here, as in FIG. 1, a respondent 12 utilizes assessment tool 14 to create personal or behavioral profile 16. Again, personal profile 16 is the accumulation and output of assessment tool 14, and can take the form of a set of answers to specific questions. Personal profile 16 is stored in a computer system. The computer system generates a sensory representation 128. Sensory representation 128 is representative of the personal profile 16 associated with respondent 12.

Sensory representation 128 can take the form of any of the five generally recognized human senses. Graphic image 20 takes the form of a sight or visual sensory representation. Other sensory representations include smell, taste, touch, and sound. The methodology shown in FIG. 9 can use substantially the same steps to realize any of five available sensory representations.

A logical sensory representation which extends the visual representation discussed above to a representation that extends in three dimensions is a touch or feel sensory representation. Personal attribute data may be utilized as described above to generate physical elements. The physical elements can be extensions of the graphical elements previously described that are embodied in a physical form so that the physical elements may be felt by a person.

To generate a touch representation which is representative of a respondent's personal or behavioral attributes, the list of behavioral and numeric content described in Table 2 above is converted to physical elements associated with specific personal attributes. The conversion process takes each personality attribute or set of related attributes and creates a corresponding physical element. The physical elements utilized for the personality attributes can be any geometric shape or form.

Like the graphical elements discussed previously, each physical element can be weighted to emphasize degrees or variations in the given personality trait. The physical elements can be made different sizes to emphasize dominance, importance and significance. The surfaces defining the physical element may be smooth, rough, angled, directional, etc., corresponding to the respondent's answers.

Here, as in creating graphical content for the eye, each physical element is created with a pre-defined set of conversion rules. There may exist multiple sets of rules in converting personality traits and values to physical elements. Moreover, the conversion rules may be changed from time to time. The conversion rules, in the case of physical elements, can evaluate and translate numerical valuation of personal and behavioral traits into position, length, curve, thickness, depth, width, etc., of physical elements on the x-axis, y-axis and z-axis. For a given set of conversion rules, the resulting physical elements which are created will be unique.

The example demonstrated in FIGS. 3A–3O can be modified somewhat to create a physical representation that uses attribute data to reflect a three dimensional object that can be felt by the respondent. For example, FIG. 3D which represents the personal trait Aggressiveness with a corresponding value of 5 can be instead thought to make a physical extension of 5 units in the positive z-axis direction. Likewise, FIG. 3F which represents the personal trait Self Esteem with a corresponding value of 4.5 can be instead thought to make a physical extension of 4.5 units in the negative z-axis direction. Various personality or behavioral traits can be associated with movements in the z-axis in the same way.

The resulting physical representation can be multifaceted similar to the graphical image representation discussed previously. In effect, the only difference between the graphical representation and the physical representation is that the physical representation takes the form of a three-dimensional surface or object which can be felt by a respondent.

Physical representations can serve many of the purposes seen by the graphical representation discussed above. In addition, physical representations can provide a vehicle for those who are visually impaired to enjoy the benefits of graphical representations of attribute data. Like graphical image representations, physical representations can be valuable as a personal identifier, or used for security purposes, or used decoratively in a variety of aesthetic settings.

Figure 10:
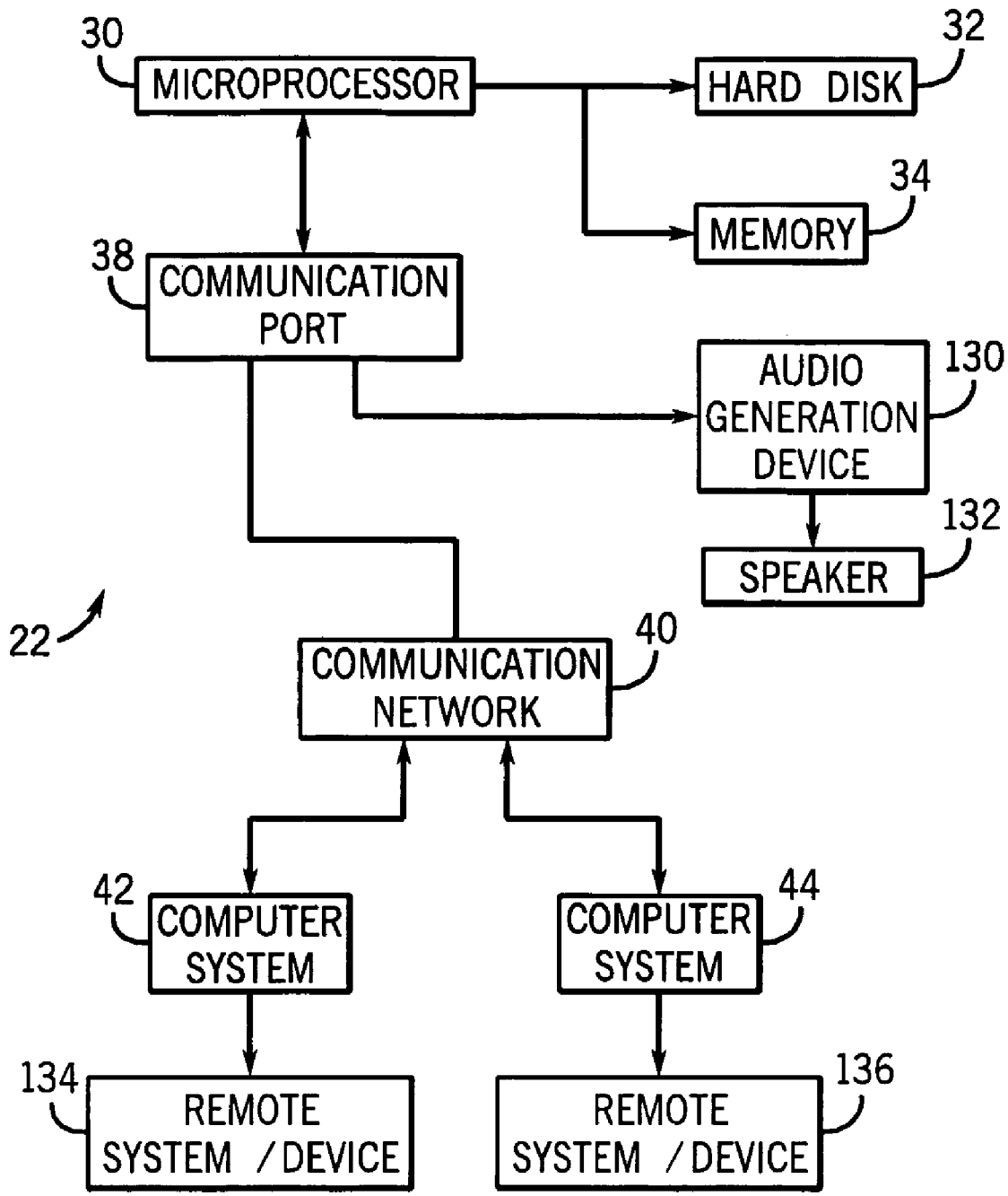
FIG. 10 is a block diagram of a computer system for processing and generating the auditory representation from the assessment data.

An additional sensory representation that can be realized using the methodology of FIG. 9 is a sound sensory representation or auditory representation. Referring to FIG. 10, an auditory representation can be obtained using computer system 22, in many ways similar to the process of obtaining a graphical image as depicted in FIG. 2. Computer system 22 is a general purpose computer including a central processing unit or microprocessor 30, mass storage device or hard disk 32, electronic memory 34, and communication port 38.

Communication port 38 includes a high speed Ethernet connection to communication network 40. Communication network 40 is an open architecture system such as the World Wide Web, commonly known as the Internet. Computer system 42 is configured as shown for computer 22 and is also connected to communication network 40, which allows communication between computers 22 and 42. Here, as in FIG. 2, respondent 12 uses computer system 42 to log onto a profiling website residing on computer system 22. The questionnaire is displayed on computer system 42 to log onto a profiling website residing on computer system 22. Computer system 22 contains software and program code necessary to execute the processes described below. Another respondent uses computer system 44 for the same purpose.

Computer system 22 stores the answer data on hard disk 32 and utilizes one or more computer programs and other application software running on the general purpose computer system, with associated microprocessor, memory, hard disk storage, and communication links such as shown in FIG. 10 to organize, analyze, and process the assessment data. The assessment data is converted into a set of auditory representation data, as described below, and output to audio generation device 130. Audio generation device can be a sound card or similar hardware in communication with microprocessor 30 through communication port 38. Audio generation device 130 can be an external piece of hardware, such as a synthesizer or similar equipment. Audio generation device 130 can have an integrated sequencer, which aids in arranging associated auditory information and is also discussed below. Audio generation device can have an associated speaker 132 which converts electrical signals received from audio generation device 130 into sound waves which are heard by a listener.

The auditory representation can be stored electronically as a file which is readable by computer system 22. One commonly known format/protocol is the Musical Instrument Digital Interface (MIDI). An auditory representation embodied in a MIDI file can be passed through communication network 40 to computer systems 42 and 44, where it can be stored on computer system 42 or computer system 44. The MIDI file can then be passed from computer system 42 to a remote computer system or remote device 134. Similarly, the MIDI file can be passed from computer system 44 to remote system or remote device 136. The MIDI file can be embodied in an article of manufacture such as a compact disk (CD) or floppy disk. The MIDI file itself can be an article of manufacture embodied in a memory file which is transferable across computer systems or computer networks.

A user can use computer system 42 through communication network 40 to access a profiling website located on computer system 22 as previously described to collect, process and store assessment data. Computer system 22 then converts the assessment data to an auditory representation as will be discussed below. The auditory representation is created and saved in MIDI format. A user can access computer system 22 through communication network 40 to transfer the auditory representation MIDI file to the user's computer system 42. The auditory representation file can then be transferred to the user's remote device 134. Remote system or device 134 can include such hardware as portable MP3 players or other similar portable hardware. Device 134 can include devices such as a cellular phone handset or similar hardware. Device 134 can include any external or embedded hardware capable of accommodating the auditory representation file. Device 134 can be an article of manufacture which is intended to accommodate the MIDI file in some way. For example, device 134 can be a specialized hardware player which is designed to convert the MIDI file to sounds which can be heard and play them back to a listener.

In a process similar to that described previously, the manner in which the questions have been answered as well as the content of the answers are organized and processed by computer system 22 into a selection of personal qualities that can be converted into a set of pre-defined musical elements. The musical elements can provide an indication or representation of the respondent's tendency toward a particular attribute. For example, if the respondent is more or less aggressive, based on the scale of assessments, a set of variables corresponding to musical elements are generated with gradations of values of that particular attribute. If the respondent is more or less submissive, based on the scale of assessments, another set of variables corresponding to musical elements can be generated with gradations of values of that particular attribute. Using techniques derived from other techniques such as handwriting analysis and universal symbology, the musical variables that attach to a particular characteristic are assigned to those characteristics and modified depending on the degree of evidence of such characteristics.

The musical elements which are linked to corresponding musical variables can include such musical qualities as rhythm, amplitude, melody, harmony, timbre, transposition, pitch or tempo. Groups of musical elements can be organized into layers. Here, as previously described, the musical qualities can be thought of as formatting features or arranging features that effectively form building blocks for an auditory representation. The formatting features can be used to indicate relative importance of the personal attributes to the personal profile of the subject. The musical elements, and in turn, musical layers, are combined and arranged together in such a way as to create an overall auditory representation that is stylistic and pleasing to the ear, yet conveys considerable information to the listener related to the respondent's personal and behavioral profile. The musical elements have meaning, both individually and collectively. The final auditory representation can be a series or sequence of combined musical elements. In some cases, the auditory representation can be akin to a song or tune.

Consider the application of the example profiling session previously described to an example conversion process taking the questionnaire results and converting them to a series of musical elements which ultimately form an auditory representation. In the example, the table of behavioral and numeric content seen previously is converted to musical elements associated with specific personal attributes.

In the example musical conversion process, each personality attribute or set of related attributes is converted to a corresponding musical element. The musical elements utilized for the personality attributes can be any of the musical elements previously described, or a variation thereof. In one embodiment, the musical element for feminine traits is a higher pitch, a larger transposition or a woodwind instrument; the musical element for masculine traits is a lower pitch, a smaller transposition or a brass instrument; the musical element for sense of belonging is a faster rhythm; the musical element for accountability is a slower tempo; and so on.

Each musical element, like each graphical element, can be weighted to emphasize degrees or variations in the given personality trait. The musical elements can be given different durations, different rhythms, different keys or chord patterns associated with a note, etc., to emphasize dominance, importance, and significance.

Consider the creation of the following musical element. While creative in content, the musical element is created with a pre-defined set of conversion rules. Here, as in the graphical conversion case, there may exist multiple sets of rules in converting personal traits and values to musical elements. Moreover, the musical conversion rules can be changed from time to time. Nonetheless, for a given group of personal traits and values, and a given set of conversion rules, the musical element takes on a predictable form. The musical conversion rules translate numerical valuation of personal and behavioral traits into a particular combination of transposition, rhythm, chord structure or scale types, key, melody, harmony, timbre, transposition, pitch, tempo or even time signature that becomes the auditory representation. For a different group of personal traits and values, and given the same set of conversion rules, the resulting musical element and overall auditory representation will be different. Therefore, each unique set of personal traits and values, for a given set of rules, will create a unique musical element and corresponding auditory representation.

Figure 11:
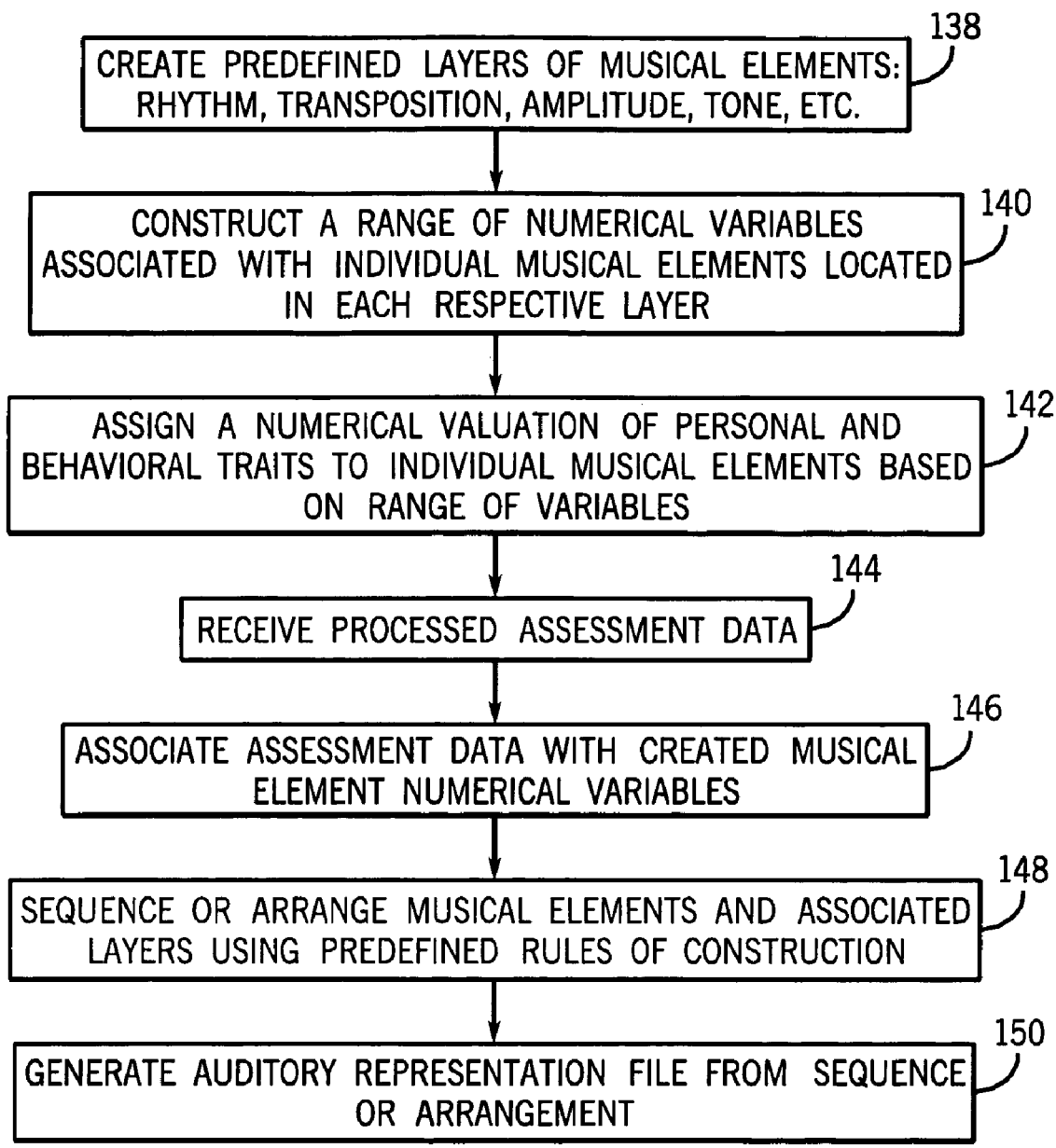
FIG. 11 illustrates the process of converting and arranging the auditory representation from the assessment data.

FIG. 11 illustrates the process of converting the plurality of personality and behavioral data into the auditory representation. As discussed previously, computer system 22 can have the necessary means to accommodate the personality and behavioral data, process the data appropriately, and perform the conversion process. Such a process can be performed with the aid of software which performs the following steps. Step 138 initiates the process by creating and organizing predefined layers of musical elements. Layers of musical elements can be organized in terms of musical elements such as rhythm, amplitude, chord and scale structure, and so on.

Step 140 constructs a series of predefined numerical variables which are then associated with individual musical elements located in organized layers. For example, a certain amplitude may have a predefined range of 0–100 which roughly corresponds to the volume level of a particular musical element. Step 142 assigns the numerical valuation of individual personal and behavioral traits to the predefined numerical variables. A value of 7 units on the scale of 0–10 units which corresponds to the particular trait Sense of Belonging can be assigned the numerical value 70 in the predefined amplitude range. In such a way, an association matrix can be constructed which includes predefined musical element variables which are linked with data variables corresponding to personality and behavioral traits.

Step 144 involves receiving processed assessment data. Processed assessment data can be the same data summaries, averages and otherwise which have been previously discussed. Once processed assessment data is received, the assessment data can be compared to the constructed association matrix in step 146. A received average value of 7 for the personality trait Sense of Belonging can be linked with the musical element variable of 70 in amplitude for that particular trait using the association matrix. Musical element variables have corresponding predefined physical musical characteristics. A musical element variable of 70 in amplitude can result in relatively louder volume of sound, for example.

Once personal attribute data is associated with individual musical element variable data using the association matrix, the musical element variable data can then be arranged or sequenced in a particular order by step 148. Sequencing of musical element data can occur using predefined rules of construction. Predefined rules can govern how and when musical layers are brought together to create the auditory representation. A predefined layer can include scale and chord construction, and can form the first layer of the auditory representation. For example, a particular trait Creativity may result in the selection of a G7 chord in the chord construction layer using a particular conversion rule. The Creativity trait may be weighted so that a higher average value results in the chord construction layer being chosen as first in priority. Selection of various musical elements proceeds as each individual musical element and layer is arranged together and sequenced. Again, the conversion and construction rules can define how each item of personal attribute data gets converted to a musical element and eventual auditory representation. Here, as discussed previously, the overall conversion and construction rules can become multi-leveled and interchangeable. Any given set of personal attribute data can be processed through any set of musical conversion rules to create a variety of combinations of musical elements. Again, a sequencer, which is a small piece of hardware or software configurable by computer system 22, can be used to store the association matrix and rules of construction, compare the incoming processed assessment data, and arrange or sequence respective musical elements and corresponding layers of musical elements to form the auditory representation.

Step 150 generates the final auditory representation file which includes the plurality of combined, arranged and sequenced musical elements. Again, the auditory representation can include a MIDI file which can be saved on computer system 22, transferred to another computer system 42, or transferred again to another remote system 134 for storage or playback as an audio file. The auditory representation file can be re-manipulated by computer system 22 using the sequencer or similar device or software. The auditory representation file can then be re-saved on computer system 22 or moved elsewhere. For example, a user can generate auditory representation file, and then later use the representation file to create derivatives of the representation file. These derivatives can be effectively "variations on a theme" and carry unlimited possibilities for use in a variety of applications and settings.

Consider the following example conversion of attribute data to musical element data, and in turn, a sample auditory representation. In the sample conversion, it is assumed that musical layers transposition, rhythm, chord structure/key, timbre 1, timbre 2 and amplitude will be created and sequenced together to construct an auditory representation. Timbre 1 and timbre 2 represent, in effect, two musical instruments with different timbre qualities. Again, however, a variety of layers and corresponding musical elements can be utilized. Received personal trait Confidence is 6.0. It is assumed that personal trait Confidence is assigned to the transposition layer. Likewise, personal trait Sense of Belonging has a received value of 7.5 and is assigned to the rhythm layer. Personal trait Optimism has a received value of 6.8 and is assigned to the chord structure/key layer. Personal trait aggressiveness has a received value of 5 and is assigned to the timbre 1 layer. Personal trait Self Esteem has a received value of 4.5 and is assigned to the timbre 2 layer. Finally, Personal trait Dominance has a received value of 3 and is assigned to the amplitude layer. In one example, the number of musical layers can coincide with the number of received personality traits.

A range of numerical variables 0–100 is assigned to each layer, including transposition. A high variable of 90 has a corresponding large transposition, for example. A low variable of 20 has a corresponding low amplitude. A high variable of timbre 1 or timbre 2 has a corresponding woodwind instrument timbre. A low variable of timbre 1 or timbre 2 has a corresponding brass or percussion instrument. The range of variables in the chord structure/key layer correspond to the range of chords or keys available. A variable of 50 corresponds to a G chord structure or key of G. With regard to the rhythm layer, a low variable corresponds to longer-held tones, such as whole notes. A high variable in the rhythm layer corresponds to shorter-held tones, such as eighth or sixteenth notes.

An association matrix is constructed, which associates received personal attribute values with corresponding musical element variables. The personal attributes are associated and assigned, accordingly. In the sample conversion, the resulting associated musical element variables are 60 (Confidence) for the transposition layer, 75 (Sense of Belonging) for the rhythm layer, 68 (Optimism) for the chord structure/key layer, 50 (Aggressiveness) for the timbre 1 layer, 45 (Self Esteem) for the timbre 2 layer, and 30 (Dominance) for the amplitude layer.

Figure 12:
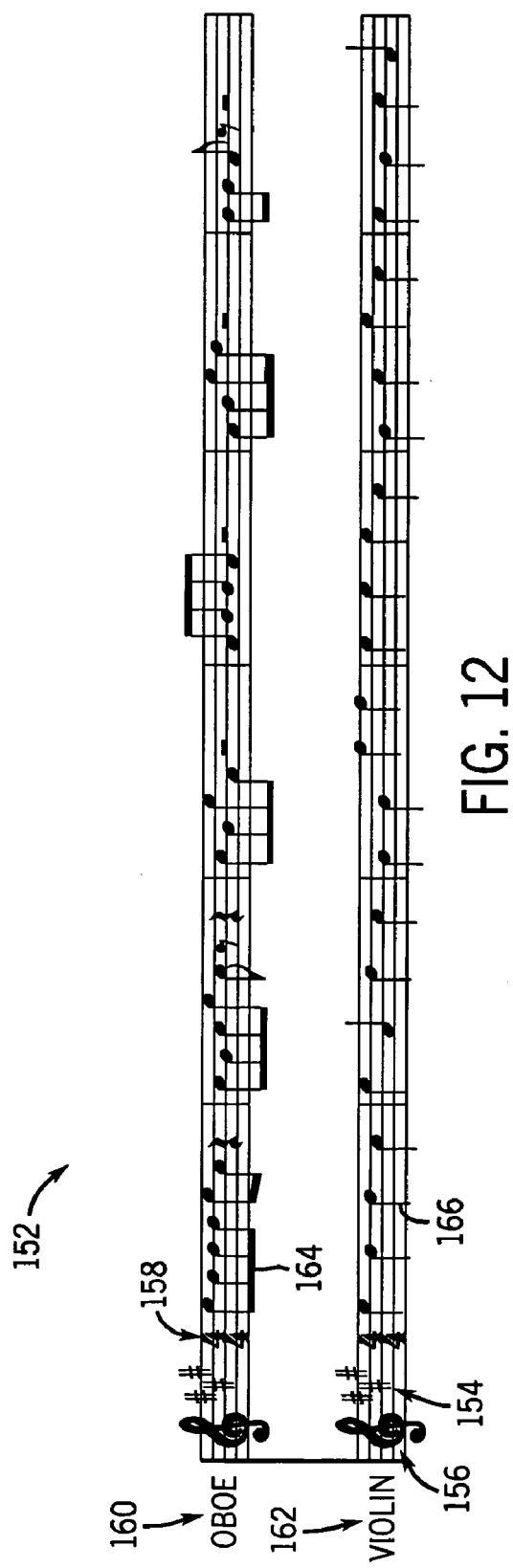
FIG. 12 illustrates sheet music notation of an example auditory representation.

The musical elements are then generated from the respective musical element variables and each layer is sequenced according to a set of predefined rules of construction. The result is the auditory representation depicted in FIG. 12. A musical element variable of 68 in the key layer results in the key of A major, shown here as key 154, being selected. The transposition variable 60 results in a medium transposition being selected, shown here as treble clefs 156. For purposes of the sample conversion, the time 4/4 is arbitrarily chosen, shown here as time 158. The musical element variables of timbre 1 and timbre 2 layers result in musical instruments oboe 160 and violin 162 being selected. The musical element variable in the rhythm layer results in a random series of eighth notes 164 generated for the timbre 1 (oboe) layer and a random series of quarter notes 166 generated for the timbre 2 (violin) layer. Finally, because the musical element variable 30 is obtained from the association matrix, a relatively softer volume is generated as the tones are played.

As previously mentioned, a virtually unlimited number of musical layers can be created and sequenced to form an auditory representation. For example, a large number of musical instrument families such as woodwinds, strings, brass, etc., can be organized into respective layers. Musical elements such as tempo or time signature can be given individual layers. Even the way individual notes are chosen (whole, quarter, eighth, sixteenth, and so on) or combined into chords can be assigned an individual musical layer. Moreover, sequencing rules, arrangement rules, or other rules of construction can be, in effect, layers which can be linked to personal attribute data. Depending on the quantity of received personality data, the possibilities for creating individualized auditory representations are virtually limitless.

The auditory representation, like the graphical image discussed previously, can be used in a myriad of applications. In one application, the auditory representation is a novelty item for personal expression, e.g., for the teenage consumer. The assessment survey can be taken as described above by a respondent who can obtain the auditory representation generated from processed assessment data. The auditory representation can be a cellular ring tone which the respondent can download to a personal cell phone handset. Because the auditory representation is unique to a respondent's set of personal and behavioral attributes, the resulting ring tone can be a unique identifier to the respondent. Just as the young market may find the use of graphical representations of personality profiles desirable, the use of an auditory representation similarly can be used as a fashion statement or expression of creativity.

Similarly to providing a unique ring tone for the respondent, the auditory representation can be utilized as an identifying signal. For example, the familiar phrase "You've got mail!" which identifies the receipt of a new mail message could be replaced with the unique auditory representation which identifies the respondent.

The auditory representation can be utilized in situations where the respondent desires to market their own personalities. For example, the auditory representation can be utilized in dating services where respondents share and compare their own unique auditory representations with those of other suitors to determine compatibility.

In addition, the auditory representation can be used by businesses who wish to market products to a segment of society. A business with a niche market can use an auditory representation which is created with generic categories of personality or behavioral traits. For example, a group or segment of society may have a particular affinity for luxury items. This group may have an associated generic auditory representation. A marketer can use the generic auditory representation to create marketing schemes incorporating the auditory representation using background music or similar means.

Because the auditory representation is a unique representation of an individual's personality and behavioral profile, the auditory representation can be used in a therapeutic setting. Longer compositions of music can be composed which are based on a respondent's auditory representation. These compositions can then be used to provide stress relief or promote other healing properties.

Figure 13:
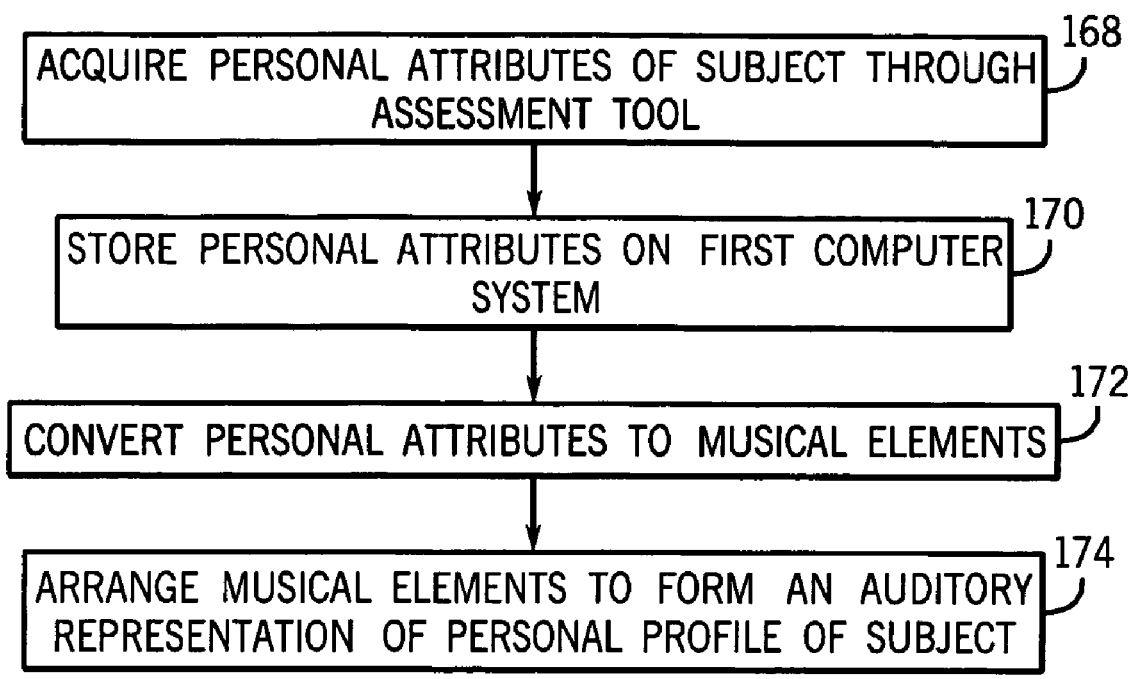
FIG. 13 illustrates the process of converting assessment data to an auditory representation of the respondent personal profile.

FIG. 13 illustrates the process of generating an auditory representation of a personal profile of a subject. Step 168 acquires personal attributes of the subject through an assessment tool. The assessment tool uses questions directed to personality traits of the subject. The personal attributes are acquired from answers to the questions directed to personality traits of the subject. Step 170 stores the personal attributes on a first computer system. The personal attributes are acquired by way of the subject accessing the assessment tool through a second computer system connected over a communication network to a website which resides on the first computer system. Step 172 converts the personal attributes to musical elements. The musical elements are features such as tone, rhythm, amplitude, transposition, tempo, timbre, chord structure and key to indicate relative importance of the personal attributes to the personal profile of the subject. Step 174 arranges the musical elements to form an auditory representation of the personal profile of the subject. The musical elements within the auditory representation are arranged in relative positions and with consideration of relative importance of each of the plurality of personal attributes to the personal profile of the subject. The auditory representation is symmetrical and multi-layered.

A person skilled in the art will recognize that changes can be made in form and detail, and equivalents may be substituted for elements of the invention without departing from the scope and spirit of the invention. The present description is therefore considered in all respects to be illustrative and not restrictive, the scope of the invention being determined by the following claims and their equivalents as supported by the above disclosure and drawings.

What is claimed is:

1. A method of generating an auditory representation of a personal profile of a subject, comprising:
   acquiring a plurality of personal attributes of the subject through an assessment tool;
   storing the plurality of personal attributes on a first computer system;
   converting the plurality of personal attributes to a plurality of musical elements; and
   arranging the plurality of musical elements to form an auditory representation of the personal profile of the subject.

2. The method of claim 1, wherein the assessment tool includes a plurality of questions directed to personality traits of the subject.

3. The method of claim 1, wherein the plurality of personal attributes is acquired from answers to the plurality of questions directed to personality traits of the subject.

4. The method of claim 1, wherein the plurality of personal attributes are acquired by way of the subject accessing the assessment tool through a second computer system connected over a communication network to a website which resides on the first computer system.

5. The method of claim 1, wherein the plurality of musical elements includes arranging features used to indicate relative importance of the plurality of personal attributes to the personal profile of the subject.

6. The method of claim 1, wherein the auditory representation includes a multi-layer arrangement of the plurality of musical elements.

7. A method of producing an auditory representation of a personal profile, comprising:
   acquiring personal attributes through an assessment tool;
   converting the personal attributes to musical elements; and
   arranging the musical elements to form an auditory representation of the personal profile.

8. The method of claim 7, wherein the musical elements within the auditory representation are arranged in relative positions and with consideration of relative importance of each of the personal attributes to the personal profile.

9. The method of claim 7, wherein the auditory representation includes a multi-layer arrangement of the musical elements.

10. A computer system for generating an auditory representation of a personal profile, comprising:
- means for acquiring personal attributes through an assessment tool;
- means for converting the personal attributes to musical elements; and
- means for arranging the musical elements to form an auditory representation of the personal profile.

11. The computer system of claim 10, wherein the auditory representation includes multi-layer arrangement of the musical elements.

12. The computer system of claim 10, further includes a website for accessing the assessment tool.

13. The computer system of claim 10, wherein the musical elements include formatting features to indicate relative importance of the personal attributes to the personal profile.

14. An article of manufacture, comprising an auditory representation of a personal profile.

15. The article of manufacture of claim 14, wherein the auditory representation is generated by a process including the steps of:
- acquiring personal attributes through an assessment tool;
- converting the personal attributes to musical elements; and
- arranging the musical elements to form an auditory representation of the personal profile.

16. The article of manufacture of claim 14, wherein the auditory representation includes a multi-layer arrangement of the musical elements.

* * * * *